(12) United States Patent
Zbinden

(10) Patent No.: US 11,925,962 B2
(45) Date of Patent: Mar. 12, 2024

(54) CLEANING DEVICE FOR OPTICAL FIBERS

(71) Applicant: Adam Jon Zbinden, Kirkland, WA (US)

(72) Inventor: Adam Jon Zbinden, Kirkland, WA (US)

( * ) Notice: Subject to any disclaimer, the term of this patent is extended or adjusted under 35 U.S.C. 154(b) by 419 days.

(21) Appl. No.: 17/408,445

(22) Filed: Aug. 22, 2021

(65) Prior Publication Data

US 2021/0379629 A1     Dec. 9, 2021

(51) Int. Cl.
*B08B 3/04* (2006.01)
*B08B 13/00* (2006.01)
*G02B 6/38* (2006.01)

(52) U.S. Cl.
CPC ............... *B08B 3/04* (2013.01); *B08B 1/165* (2024.01); *B08B 13/00* (2013.01); *B08B 2240/02* (2013.01); *G02B 6/3866* (2013.01)

(58) Field of Classification Search
CPC .......... B08B 3/04; B08B 1/005; B08B 13/00; B08B 2240/02; G02B 6/3866
USPC ...................................................... 134/122 R
See application file for complete search history.

(56) References Cited

U.S. PATENT DOCUMENTS

2014/0123482 A1*  5/2014  Kanayama ............... G02B 6/25
                                                          29/795

* cited by examiner

*Primary Examiner* — Tinsae B Ayalew

(57) ABSTRACT

A means of integrating the materials and automating the actions required for the cleaning of optical fiber, where the present invention can hold cleaning material, dispense cleaning agent, and clean multiple fibers, while routing conduits and cleaning pads protect the optical fiber from mechanical stress.

2 Claims, 3 Drawing Sheets

CLEANING DEVICE FOR OPTICAL FIBERS

BACKGROUND OF THE INVENTION

Cleaning of optical fibers is necessary prior to terminating or splicing. A common method involves the use of hand-held pre-soaked individually wrapped alcohol wipes, or the dispensing of alcohol solution onto a lint-free disposable cloth with a spray bottle, and then manually wiping the fiber with either material. A device which could automate the cleaning process is therefor desirable. Such a device would provide improvements in efficiency and effectiveness, in terms of maximizing the potential of cleaning materials and minimizing the time required for the cleaning process, while protecting the fiber from mechanical stress.

SUMMARY OF THE INVENTION

The present invention can clean multiple fibers at once. It provides an integration of the fibrous and liquid components of the cleaning regimen and integrates all cleaning functions into one mechanical embodiment. No manual contact with the cleaned optical fiber segment is required. A clamshell conduit router for multiple fibers ensures that the fibers will receive tensile stress along their longitudinal axes, to prevent breaking. Cleaning agent is introduced to the fibrous receiving material on an as-required basis, while the cleaning stand, when closed around the optical fiber, also minimizes evaporative losses of cleaning agent. The material feeds from a rotating axle mounted inside of the cleaning material holder, through a horizontal aperture on its top, to the stationary cleaning surface pad, through a retainer located on the mobile cleaning surface pad, on the way to the pad itself, and finally terminates at a serrated region, located on the mobile cleaning surface, on a side opposite the pad.

DETAILED DESCRIPTION OF THE INVENTION

Figure 1:
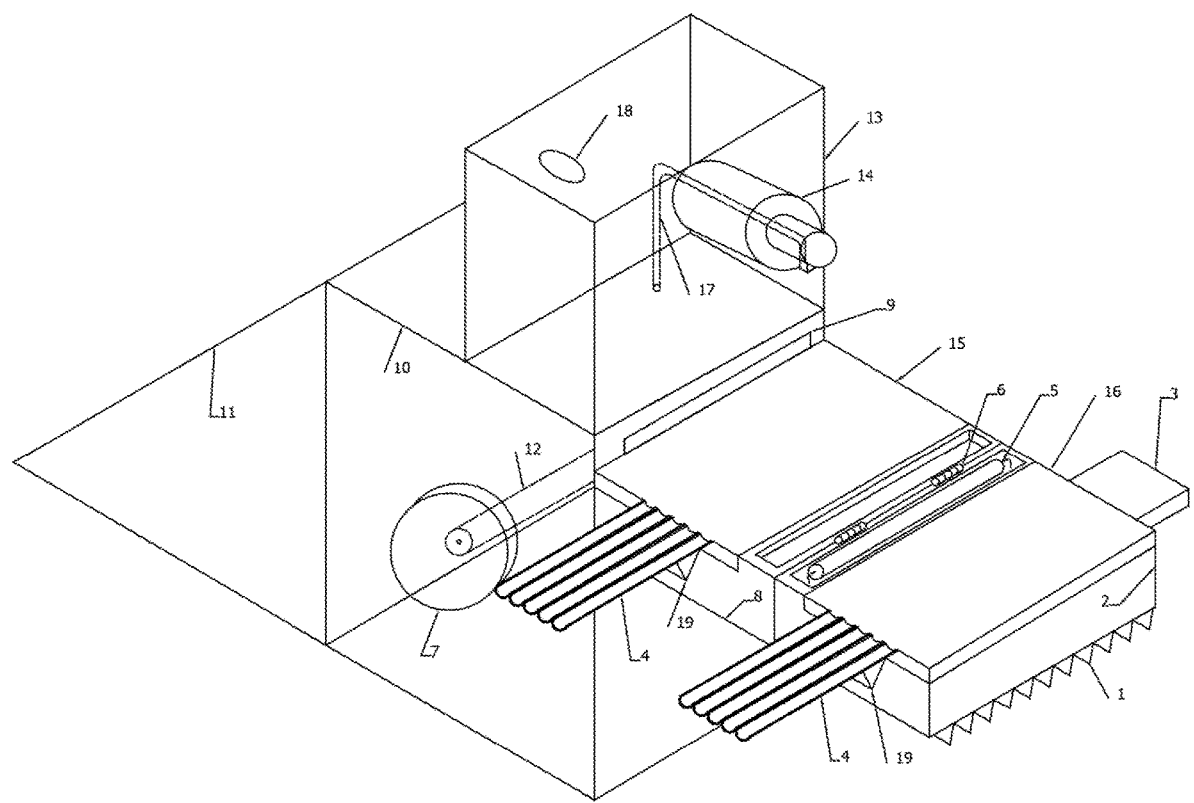
FIG. 1 is a depiction of the present invention, where 1 is the serrated surface, 2 is the mobile cleaning surface half, 3 is the tab used to actuate the mobile cleaning surface, 4 is the fiber routing guide, 5 is the material retainer with a rotating element, 6 shows the hinges which couple the stationary and mobile halves of the cleaning surface stand, 7 is the rotating knob which mechanically couples to the axle 12 located internal to the cleaning material holder 10 with an opening-face shown with 11 and a horizontal aperture shown with 9. 13 shows the cleaning agent container vessel, 14,17 is the pump-spray dispenser, and 18 shows the sealable aperture in the cleaning agent vessel for refilling cleaning agent. 15 is a pad located on the stationary cleaning surface 8. 19 shows the rigid structural connection between the cleaning surface support stands 2,8 and the fiber routing guides 4. 16 is a pad located on the mobile cleaning surface 2.
Figure 2:
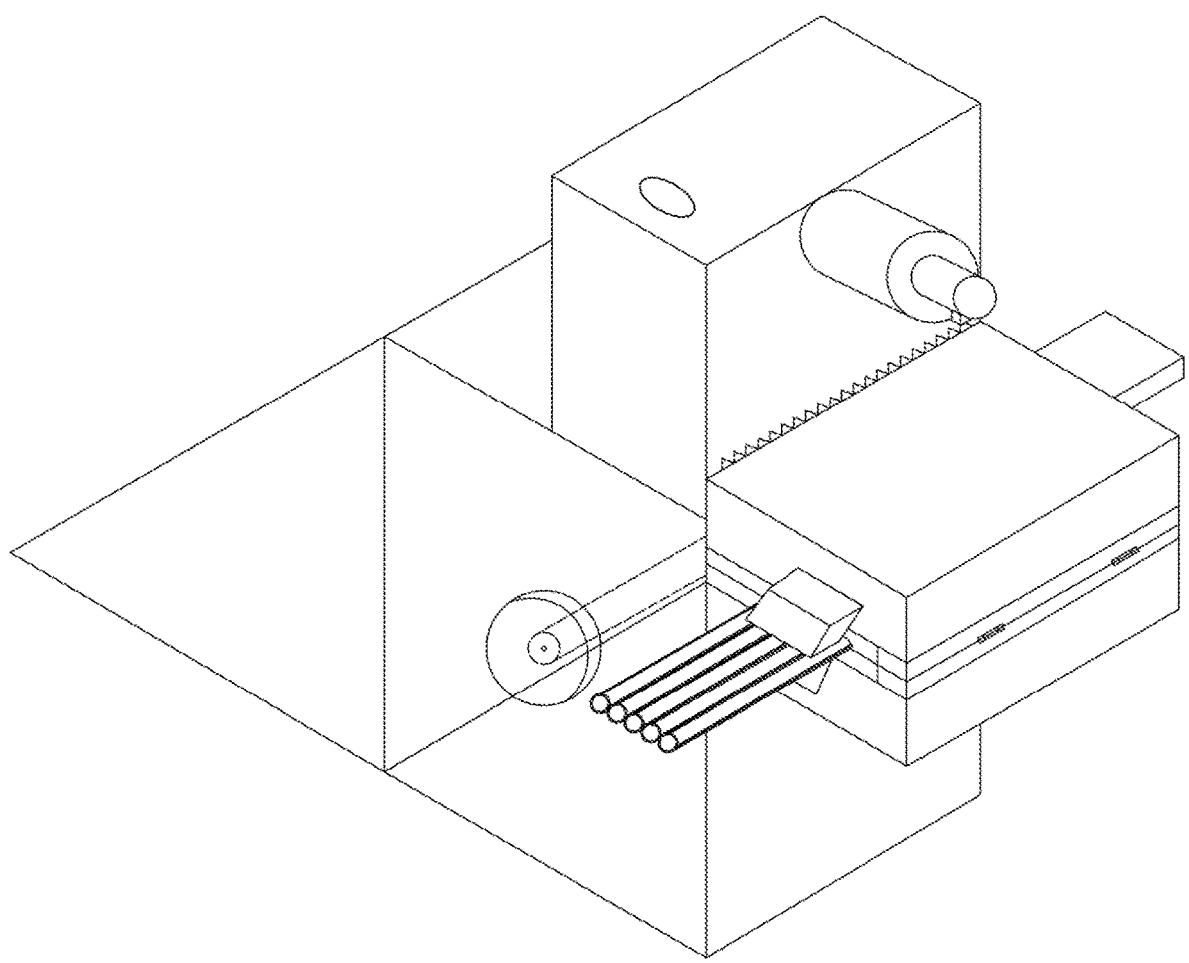
FIG. 2 is a view of the present invention when the mobile half of the cleaning surface stand 2 is closed over the stationary half of the cleaning surface 8.
Figure 3:
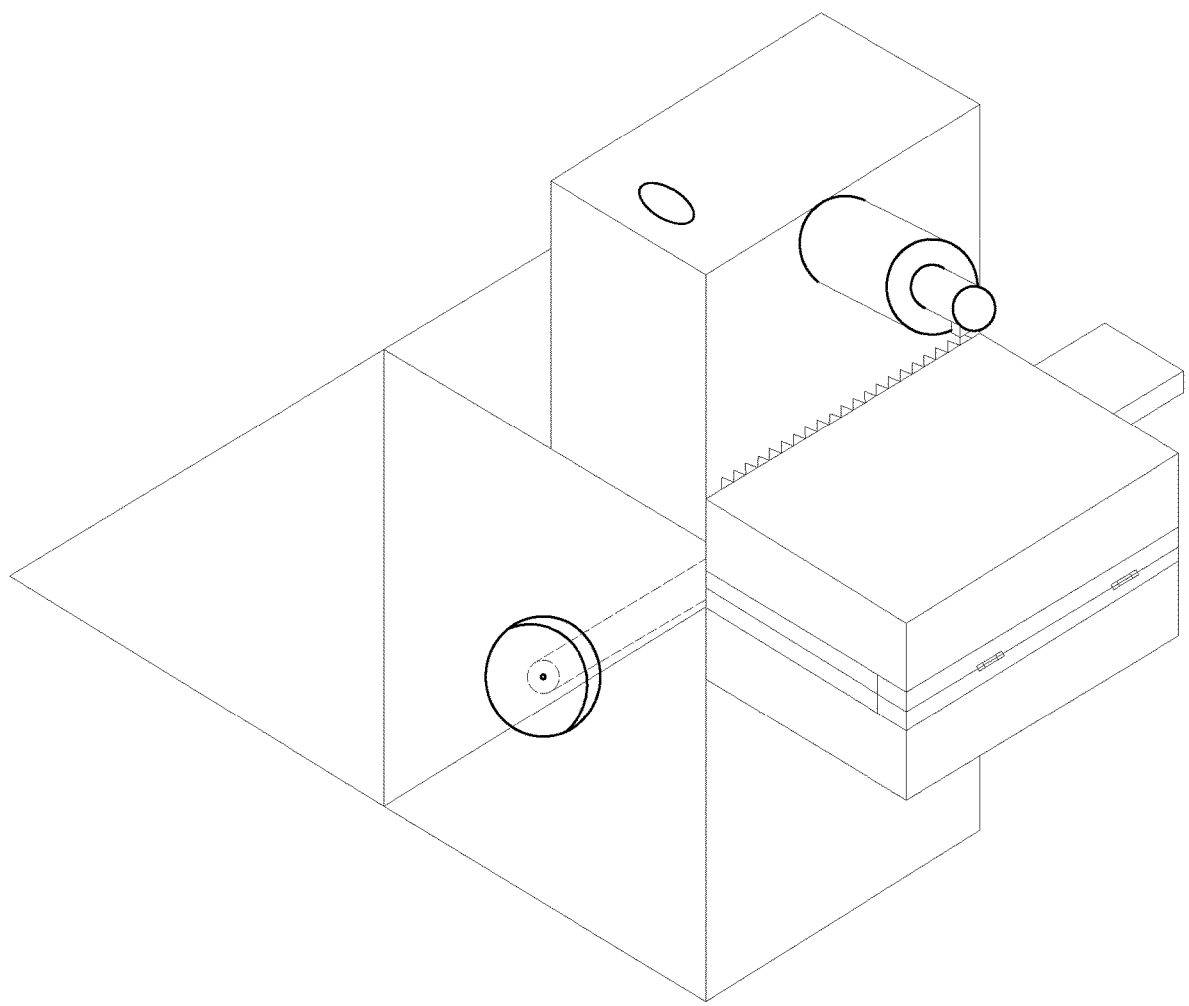
FIG. 3 is a view of the present invention, in an embodiment that does not feature the hemi-cylindrical fiber routing guides 4.

To use the device, a roll of cleaning material is installed on the removeable axle, which is mounted internal to the cleaning material holder, through the open rear face of the container. Then material is threaded through the horizontal aperture, located on the front face, over the stationary cleaning pad, through the retainer, and over the mobile cleaning pad, and terminates at the serrated edge on the mobile cleaning surface support stand.

Then the pump dispenser applies cleaning agent to the stationary cleaning pad, the mobile cleaning pad is actuated about the hinges to contact the stationary surface, an action which evenly distributes cleaning agent to both cleaning pads, and then the cleaning stand is opened again.

The fibers to be cleaned are inserted through the fiber routing guides, such that the stripped fiber segment is entirely supported by the cleaning pad, and the jacketed or acrylate-coated fiber segment is supported in the routing guide.

The mobile cleaning pad is then closed over the fibers, to contact the stationary cleaning pad. No external pressure is applied to the mobile cleaning surface when it is closed over the fiber strands.

With the cleaning surface pads closed around the fiber, the ends of the fibers are pulled straight out of the clamshell fiber routing guide conduits, which cleans the ends of the fibers which were in contact with the cleaning pads.

The described components of the present invention can be manufactured from durable polymers, with silicone rubber used for cleaning pads and aperture seals, and hinge hardware fabricated from metal.

The liquid cleaning agent dispenser is configured to only apply cleaning agent to the stationary cleaning surface stand and associated pad; the mobile half of the cleaning surface stand does not directly receive cleaning agent until it contacts the stationary half of the folding cleaning surface stand. In this way, the mobile half of the cleaning surface stand provides a dry cleaning material surface for "wet to dry" cleaning techniques, where a fiber optic end connector is first cleaned with wet solvent, and then wiped with a dry cloth.

The invention claimed is:

1. A device for cleaning optical fiber, comprising:
   a cleaning material holder, comprising a container with an internally mounted axle which supports a roll of cleaning material, where said axle is mechanically coupled with a control knob which is externally mounted to a side region of the container, where the container has a region which opens to provide access for installing said cleaning material, and a front region has a horizontal aperture;
   a folding cleaning surface stand, where one half is stationary and another half moves about a plurality of hinges located at a junction interface region between the two halves, and the stationary half is connected to the cleaning material holder on the front region of said material holder, where a top region of the stationary half is located beneath and adjacent the horizontal aperture;
   a liquid cleaning agent container with an integrated spray pump dispenser, located on the cleaning material holder, where said pump dispenser disburses cleaning agent onto the cleaning surface stand;
   a cleaning material retainer, located on the cleaning surface stand, with a rotating surface element;
   a pair of deformable pads which are inlaid to the cleaning stand surfaces, and which contact optical fibers to form a contact surface between the device and the optical fibers being cleaned;
   a serrated edge, located on the mobile half of the cleaning surface stand, on a side opposite the contact surface, which provides a means for separating disposable sections of cleaning material; and, a tab connected to the mobile half of the cleaning stand, which provides a gripping location for manual actuation of the mobile half.

2. The device of claim 1, which includes a pair of hemi-cylindrical fiber routing guides connected with the mobile and stationary halves of the cleaning surface stand.

\* \* \* \* \*